United States Patent
Kolar et al.

(10) Patent No.: US 10,754,427 B2
(45) Date of Patent: Aug. 25, 2020

(54) DISPLAY SYSTEM FOR BLENDING SYSTEMS

(71) Applicant: Vita-Mix Management Corporation, Olmsted Township, OH (US)

(72) Inventors: David J. Kolar, Stow, OH (US); Jack W. Gee, II, Willoughby, OH (US); Phonesacksith Guy Kettavong, Medina, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 0 days.

(21) Appl. No.: 15/557,489

(22) PCT Filed: Mar. 14, 2016

(86) PCT No.: PCT/US2016/022288
§ 371 (c)(1),
(2) Date: Sep. 12, 2017

(87) PCT Pub. No.: WO2016/145430
PCT Pub. Date: Sep. 15, 2016

(65) Prior Publication Data
US 2018/0059790 A1    Mar. 1, 2018

Related U.S. Application Data

(60) Provisional application No. 62/131,962, filed on Mar. 12, 2015.

(51) Int. Cl.
*G06F 3/01* (2006.01)
*A47J 43/046* (2006.01)
(Continued)

(52) U.S. Cl.
CPC ............ *G06F 3/016* (2013.01); *A47J 36/321* (2018.08); *A47J 43/046* (2013.01); *A47J 43/07* (2013.01);
(Continued)

(58) Field of Classification Search
CPC ........ G06F 3/016; G06F 3/002; A47J 36/321; A47J 43/046; A47J 43/07; A47J 43/0716; A47J 43/27; A47J 2203/00
See application file for complete search history.

(56) References Cited

U.S. PATENT DOCUMENTS 6,210,033 B1    4/2001    Karkos, Jr. et al.
6,364,522 B2    4/2002    Kolar et al.
(Continued)

FOREIGN PATENT DOCUMENTS

CN    101194807    6/2008
EP    3120741    1/2017
WO    2014144638    9/2014

OTHER PUBLICATIONS

Patent Cooperation Treaty (PCT), International Search Report and Written Opinion for Application PCT/US2016/022288 filed Mar. 14, 2016, dated Jul. 18, 2016, International Searching Authority, US.

(Continued)

*Primary Examiner* — Sejoon Ahn
(74) *Attorney, Agent, or Firm* — McDonald Hopkins LLC

(57) ABSTRACT

A blending system is provided for displaying information. The blending system may include a display system. The display system may project or display an image on a blending container. The image may be a gradient marking or text relating to a blending process. The display system may contain a projection device capable of projecting an image, a control component operatively controlling the blender
(Continued)

display system and at least one sensor operatively evaluating data associated with a blender device to provide feedback to the control component.

13 Claims, 7 Drawing Sheets

(51) Int. Cl.
*A47J 43/07* (2006.01)
*A47J 43/27* (2006.01)
*A47J 36/32* (2006.01)
*G06F 3/00* (2006.01)

(52) U.S. Cl.
CPC ....... *A47J 43/0716* (2013.01); *A47J 43/0722* (2013.01); *A47J 43/27* (2013.01); *G06F 3/002* (2013.01); *A47J 2203/00* (2013.01)

(56) References Cited

U.S. PATENT DOCUMENTS

| | | | | |
|---|---|---|---|---|
| 6,393,162 B1* | 5/2002 | Higurashi | | G06T 5/006 |
| | | | | 345/629 |
| 6,402,365 B1* | 6/2002 | Wong | | A47J 43/046 |
| | | | | 241/36 |
| 6,460,999 B1* | 10/2002 | Suzuki | | G03B 21/14 |
| | | | | 348/E9.027 |
| 6,609,821 B2 | 8/2003 | Herbert | | |
| 6,959,562 B2 | 11/2005 | Navedo et al. | | |
| 6,979,096 B2 | 12/2005 | Ortega | | |
| 7,027,659 B1* | 4/2006 | Thomas | | H04N 19/597 |
| | | | | 382/254 |
| 7,290,724 B2 | 11/2007 | Lin et al. | | |
| 7,422,362 B2 | 9/2008 | Sands | | |
| 8,616,250 B2 | 12/2013 | Herbert | | |
| 8,870,812 B2* | 10/2014 | Alberti | | A61M 1/28 |
| | | | | 604/29 |
| 9,232,201 B2* | 1/2016 | Nicholson | | H04N 9/3182 |
| 9,259,122 B2 | 2/2016 | Martin | | |
| 2002/0009016 A1 | 1/2002 | Ancona et al. | | |
| 2002/0141286 A1* | 10/2002 | Wulf | | A47J 43/0727 |
| | | | | 366/206 |
| 2002/0145878 A1* | 10/2002 | Venegas, Jr. | | F21S 8/083 |
| | | | | 362/431 |
| 2003/0102005 A1* | 6/2003 | Muraki | | A45D 2/48 |
| | | | | 132/217 |
| 2003/0141456 A1* | 7/2003 | McNeal | | G01F 23/292 |
| | | | | 250/357.1 |
| 2003/0156424 A1* | 8/2003 | Grutze | | G09F 19/18 |
| | | | | 362/514 |
| 2003/0174120 A1* | 9/2003 | Weiner | | G06F 1/1616 |
| | | | | 345/156 |
| 2004/0195117 A1* | 10/2004 | Brand | | A47G 19/2227 |
| | | | | 206/217 |
| 2004/0220690 A1* | 11/2004 | Hong | | B29C 33/3835 |
| | | | | 700/98 |
| 2004/0236769 A1* | 11/2004 | Smith | | G06F 3/0481 |
| 2004/0247173 A1* | 12/2004 | Nielsen | | G06T 3/0062 |
| | | | | 382/154 |
| 2005/0007652 A1* | 1/2005 | Winkler | | G09G 3/3433 |
| | | | | 359/298 |
| 2005/0089244 A1* | 4/2005 | Jin | | G06K 9/209 |
| | | | | 382/284 |
| 2005/0229795 A1 | 10/2005 | Stuckey | | |
| 2006/0028618 A1* | 2/2006 | Ono | | A61B 3/1241 |
| | | | | 351/206 |
| 2006/0214765 A1 | 9/2006 | Pitchers et al. | | |
| 2008/0129896 A1* | 6/2008 | Kuwata | | G02B 3/005 |
| | | | | 349/5 |
| 2008/0246895 A1* | 10/2008 | Kuwata | | G02F 1/1334 |
| | | | | 349/5 |
| 2010/0054545 A1* | 3/2010 | Elliott | | A61B 5/0059 |
| | | | | 382/115 |
| 2010/0328903 A1* | 12/2010 | Nagaike | | G02F 1/13452 |
| | | | | 361/748 |
| 2011/0088558 A1 | 4/2011 | Farrell et al. | | |
| 2011/0253693 A1 | 10/2011 | Lyons et al. | | |
| 2012/0234704 A1* | 9/2012 | Levy | | A45C 15/00 |
| | | | | 206/216 |
| 2014/0065925 A1* | 3/2014 | Oren | | A63H 33/22 |
| | | | | 446/227 |
| 2014/0286120 A1 | 9/2014 | Kolar | | |
| 2015/0334336 A1* | 11/2015 | Chiu | | H04N 5/4403 |
| | | | | 348/383 |
| 2016/0191877 A1* | 6/2016 | Ono | | H04N 9/3185 |
| | | | | 348/744 |

OTHER PUBLICATIONS

Supplementary European Search Report for Application No. 16762693.6 in connection with PCT/US2016022288, dated Oct. 23, 2018, 9 pages.

* cited by examiner

DISPLAY SYSTEM FOR BLENDING SYSTEMS

RELATED APPLICATIONS

This application claims the benefit of International Application No. PCT/US2016/022288 filed on Mar. 14, 2016, and entitled "DISPLAY SYSTEM FOR BLENDING SYSTEMS", which claims priority to and the benefit of U.S. Provisional Patent Application Ser. No. 62/131,962, filed Mar. 12, 2015, and entitled "DISPLAY SYSTEM FOR BLENDING SYSTEMS," the entirety of which are incorporated herein by reference.

TECHNICAL FIELD

The present invention relates to a blending system and, more particularly, to a display system for a blending system that displays information on a blending container.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blender. Such drinks also may be made at home, using a personal blender.

One disadvantage with using blending systems is that the display of information is limited. Display screens, such as liquid crystal display (LCD) screens, may be expensive, difficult to implement, and may occupy valuable space in and on a blender base. Further, LCD displays may be fragile and may be prone to cracking and water intrusion.

Therefore, a need exists for improved systems and methods for blending contents in a blender. Further, there is a need for improved displays for blending systems.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blending system having various innovative features is provided herein. The blending system may include a display system that displays information on a blending container. The display system may project an image onto the blending container.

A blending display system having various innovative features is provided herein. The blending display system may display information on a blending container. The display system may project an image onto the blending container.

A method for displaying information with a blending system having various innovative features is provided herein. The method may provide for selecting an image for display. The method may provide for determining a target display area. The image may be displayed on a blending container via a projection device.

In an aspect, the technology provides a blending system including a base with a motor, a container operably attached to the base; and a display system configured to project an image. In one embodiment, the base may include the display system. In another embodiment, the display system may be operatively attached to the base or it may be adjacent to the blending system. The display system may include a projection device capable of projecting an image, a control component operatively controlling the display system, and at least one sensor capable of evaluating data to provide feedback to the control component. The display system may also include an interface component including user controls.

In an embodiment, the projection device may also include any or all of the following: at least one lens, at least one light source, and/or at least one focus device. In an embodiment, the sensor of the blending system may be selected from at least one of temperature sensor, a motion sensor, a proximity sensor, a pressure sensor, an infrared sensor, a spectrometer, an optical scanner, or a multi-wave length scanner. These sensors may detect a triggering event and project an image onto the blending system in response. The image projected onto the blending system may be a recipe, a measurement of an ingredient, a fill line, a clock, a timer, or a graphical image.

In one aspect, the technology provides a blender display system include a projection device capable of projecting an image, a control component operatively controlling the blender display system, and at least one sensor operatively evaluating data associated with a blender device to provide feedback to the control component. The projection device may be within a blender lid. The blender lid may also include a power source. The projective device may receive power from a blender base of the blender device.

In one aspect, the technology also provides a method of displaying images on a blending system including, selecting, by a display system, an image for display onto a blender container and displaying the image on the blender container. The method may also include determining, by the display system, a target display area of the blending container. Additionally, the method may include receiving feedback from blending sensors and adjusting the display in response to the feedback.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which.

DETAILED DESCRIPTION

Figure 1:
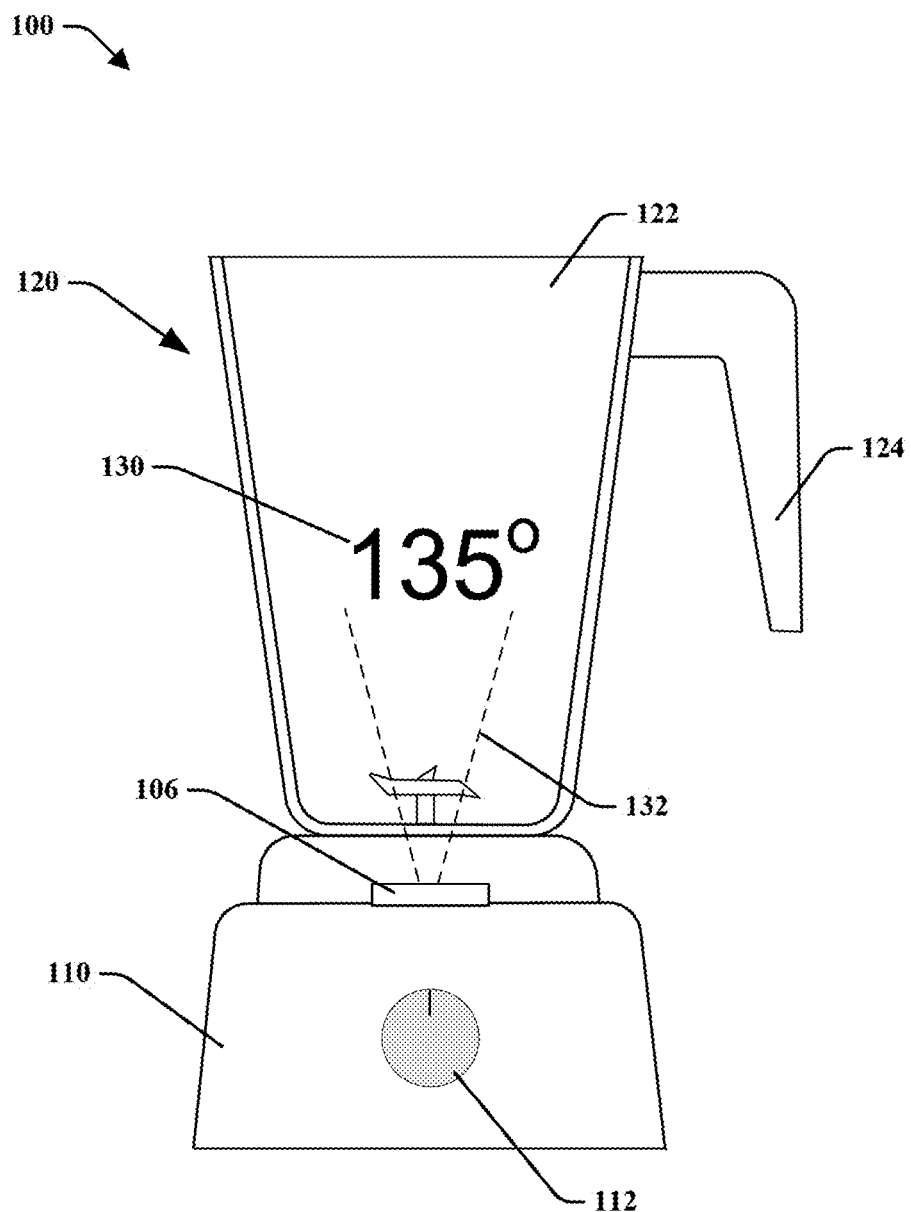
FIG. 1 is a front view of an exemplary blending display system in accordance with various described embodiments.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Still further, "user," "customer," "consumer," may include a commercial establishment(s), such as a restaurant, restaurant chain, commercial kitchen, grocery store, café, convenience store, ice-cream shop, smoothie restaurant, or the like.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, xth generation long term evolution, or another IEEE 802.XX technology. Furthermore, embodiments may utilize wired communications.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, etc. In an embodiment, the blender may be controlled by a smart device or computer and may utilize the device's speakers.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the like. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attached. The blending container may be powered in any appropriate manner, such as disclosed in U.S. patent application Ser. No. 14/213,557, entitled Powered Blending Container, which is hereby incorporated by reference. Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Aspects of systems, apparatuses or processes described herein generally relate to display systems for blending or mixing systems. In an embodiment, the display system may be attached to or comprised within a larger component of a blending system, such as blender base, a lid, a blending container, or the like. According to an example, the display system may be attached to or otherwise supported by a body of the blender base. Further, in at least one embodiment, the display system may be a stand alone, or separate device that may not physically contact the blender base. As an example, the display system may be configured to rest on a table or counter, attach to a cabinet, wall, or the like. The display system may determine the position of a blender and/or a user may operatively position the blender within a line of sight of the display system. In an embodiment, the display system may be removable from the blending system and/or be attachable to various blenders or kitchen appliances. For instance, the display system may be operatively connected to a communications port (e.g., a universal serial bus (USB) port), or wirelessly, or the like. In an embodiment, the display system may be adjacent to the blending system, i.e., operatively positioned to project the image onto or near the blending system without physically touching the blending system.

The display system may include a projection device that projects an image onto a blending container or other surface, such as a wall, cabinet, or counter. The projection device may include a light source, a lens, and the like. A controller of the display system may control an image that is projected by the projection device. It is noted that examples may use terms such as project, display, or the like interchangeably unless context suggests otherwise or warrants a particular distinction among the terms. It is further noted that the image may include textual images (e.g., images comprised of numbers, letters, and/or symbols), non-textual images (e.g., logos, pictures, graphical images, etc.), and the like. The image may include information, such as temperature of foodstuffs, time associated with a blending process, user defined information (e.g., "Blending Mom's Famous Milk Shake", etc.), recipes, ingredients, instructions to add ingredients and volume of ingredients to add, date/time information, greetings, logos, advertisements, videos, use history information, and the like.

As noted herein, the display system may comprise a housing that is attachable to one or more components of a blending system. For instance, the display system may be attached to a blender base. In other described embodiments, the display system may be comprised within other components of a blending system. According to an example, a blender base may comprise the display system.

Various aspects of a blending system will now be defined in detail with reference to the attached drawings. It is noted that like-named components (e.g., systems, devices, etc.) may include like functionality and/or aspects, unless context suggests otherwise or warrants a particular distinction among such components. For instance, a display system may be described with reference to the various figures (e.g., display system 106, display system 206, etc.) and each of the display systems may include similar functionality and/or aspects.

Referring now to FIG. 1, there depicted is a front view of a blending system 100 including a display system 106. Blending system 100 may primarily include a blender base 110, a blending container 120, and display system 106. Blender base 110 may include a control 112, a motor, and other components for driving a blade assembly and/or controlling various aspects of a blending process. Examples of these features are shown and described in US20140247686, entitled "Blending System," which is hereby incorporated by reference. Blending container 120 may include a body 122 and a handle 124. In an aspect, the body 122 may include various materials such as plastic, metal, glass, or a combination thereof. For instance, body 122 may include thermal shock-resistant glass, a polymer material, polycarbonate, BPA (bisphenol-a) free plastic, a food grade plastic, Tritan, or the like. In another aspect, body 122 may be formed of a clear material, an at least partially transparent material, an opaque material, a colored material (e.g., partially transparent material having a color, non-transparent material having color, etc.), or the like.

In embodiments, display system 100 may generate or project an image 130 via light beams or emissions 132 onto container body 122. As described here and elsewhere, image 130 may include various types of information. For instance, the image 130 may include textual images (e.g., images comprised of numbers, letters, and/or symbols), non-textual images (e.g., logos, pictures, graphical images, gradient markings, instructive markings, etc.), and the like. Likewise, the image 130 may include information, such as temperature of foodstuffs, recipes, instructions to add ingredients, a fill indicia (e.g., line to which an ingredient should be filled), measurement indicia, time associated with a blending process, display options (e.g., configurable options), user defined information (e.g., "Blending Mom's Famous Milk Shake", etc.), date/time information, greetings, logos, advertisements, videos, use history information, and the like. Moreover, body 122 may be formed from a material to enhance image 130 on the body 122, e.g., the body 122 may be formed with particles that enhance the image 130 on the body 122.

It is noted that the type of information is not limited to examples provided herein. For instance, the image may include any information related to a blending process. Furthermore, the image may include video, moving images, or the like. Likewise, a user may designate or define information that they wish the display system 106 to display. In an example, a user may provide a custom image or message to display system 106, and display system 106 may display the custom image/message.

Figure 3:
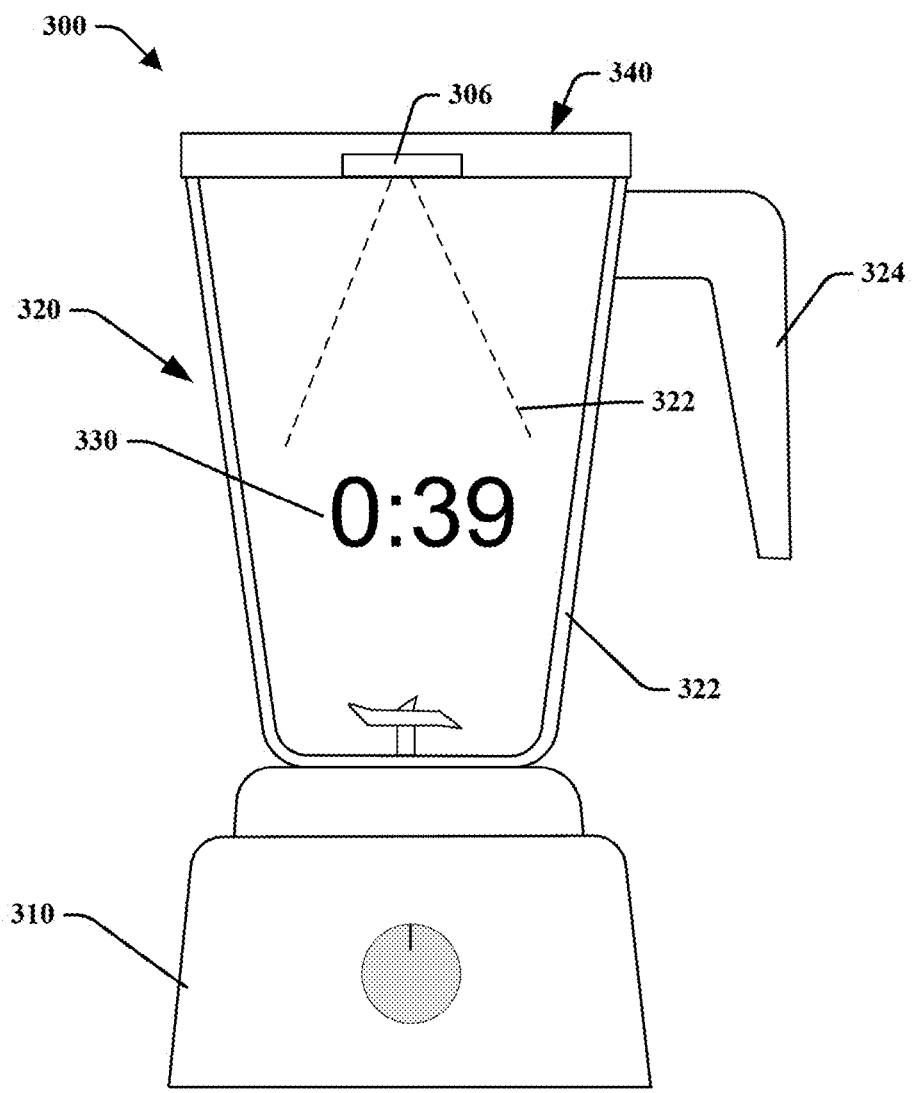
FIG. 3 is a front view of an exemplary blending display system in accordance with various described embodiments.

In at least one embodiment, display system 106 may be attached to one or more components of blending system 100. For instance, blending system 106 may comprise various devices or components (e.g., lens, focusing device, light source, power source, etc.) contained within a body or housing. The housing may be attached to various components of the blending device. For instance, the display system 106 may be attached (e.g., removably or irremovably) to blender base 106, handle 124, a lid (e.g., as shown in FIG. 3), or the like. It is noted that the housing may include a cover or shield. The cover may cover or protect a lens. Likewise, the cover may be removed, opened/closed, and the like.

In one or more other embodiments, various components of blending system 100 may comprise all or some of display system 106. For example, blender base 110 may comprise display system 106 within a body of the blender base 110. For instance, a light source, a controller, and the like may be internal to the blender base 110. In another aspect, blender base 110 may include a lens or projection portion that is disposed on or near a surface of the blender base 110. As such, the lens may be flush, recessed, and/or raised with the surface of blender base 110. In some embodiments, the lens may be at an angle in comparison with a surface of the blender base 110. For example, a portion of the surface of blender base 110 may be on a horizontal plane and the lens may by on a plane other than horizontal.

Moreover, while FIG. 1 depicts light emissions 132 as originating from a mid point or middle of the front side of blender base 110, the light emissions 132 may originate from one or more other positions. For example, display system 106 may comprise a lens disposed at one or more sides (e.g., front, left, right, back, etc.) of blender base 110. In another aspect, a lens may be disposed near a corner of blender base 110. In some embodiments, display system 106 may include multiple light sources that may project on a common area or surface and/or different surface of container body 122.

Figure 2:
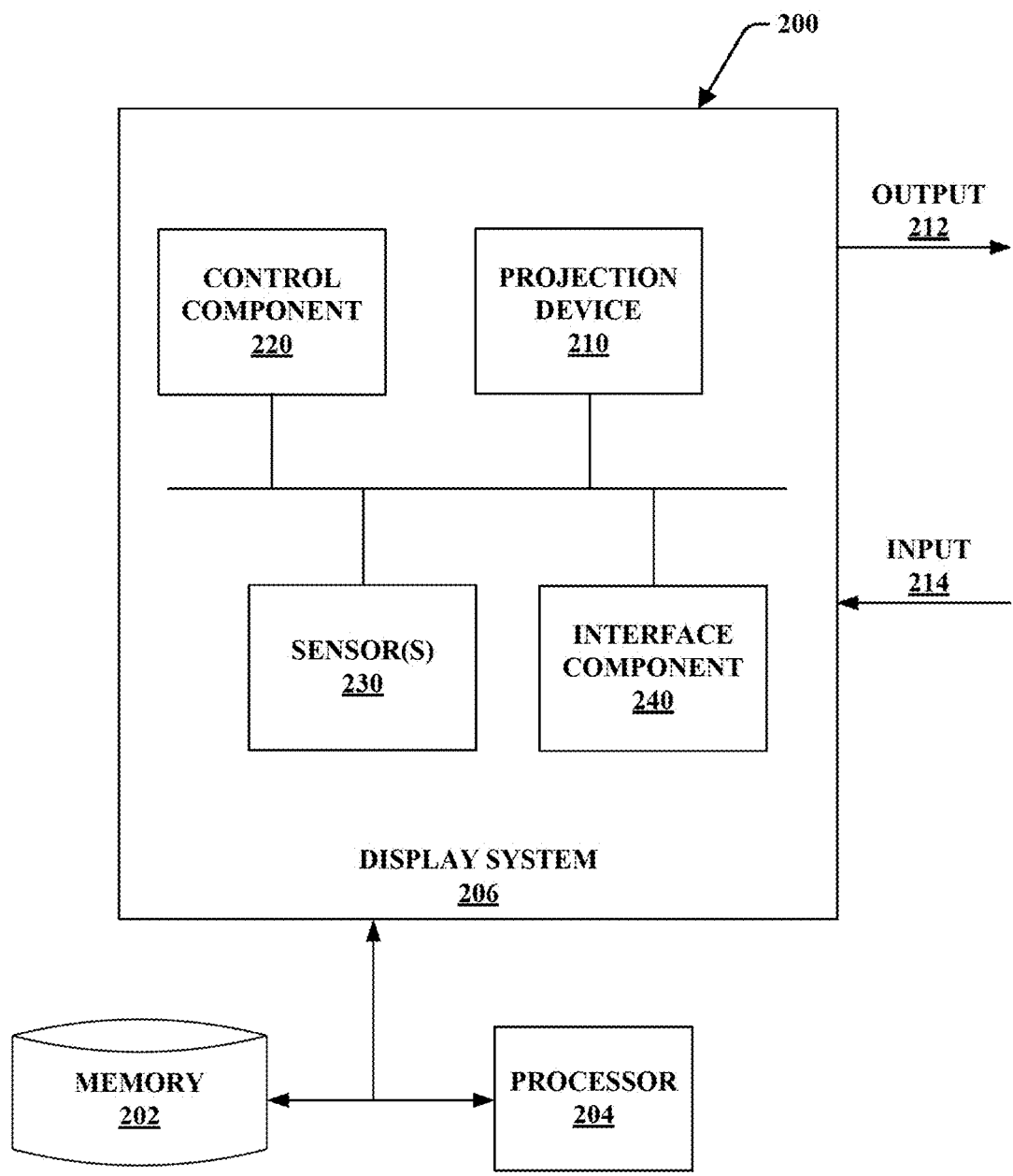
FIG. 2 is a functional block diagram of a blending display system including in accordance with various described embodiments.

Referring now to FIG. 2, there depicted is a block diagram of at least a portion of a functional blending system 200 that may include a display system 206. Blending system 200 may primarily include display system 206, memory 202, and processor 204. Memory 202 may be configured for storing computer executable components such as an ingredient component control component 220 and interface component 240. Processor 204 may facilitate operation of the computer executable components. It is noted that system 200 may include one or more devices, such as a user device, a blender device, and a scale. It is further noted that one or more devices may comprise, at least in part, the various components. For instance, a single component of system 200 may be comprised by one or more devices. While shown as separate or distinct components, the components of system 200 may be comprised by one or more components.

As depicted display system 206 may include projection device 210, control component 220, one or more sensor(s) 230, and interface component 240. Projection device 210 may comprise one or more lenses, a focus device (e.g., a motor and/or rails that position or orient the one or more lenses), one or more light sources, and the like. For instance, the projection device 210 may include one or more light emitting diodes (LEDs). The LEDs may be of a determined color channel, such as red, green, and/or blue. In some embodiments, the light source may include an array of different color diodes, such as a liquid crystal on silicon (LCOS) array on a silicon chip. The various color diodes may be controlled (e.g., via processor 204) to generate different color images. In at least one embodiment, the projection device 210 may include a single color light source. For instance, the light source may include a red diode for generating images in the color red.

The one or more lenses may be adjusted by a focus device to adjust an output 212, such as an image (e.g., image 130) projected on a surface (e.g., container body 122). The focus device may include manual focus devices (e.g., a dial that mechanical focuses the lens), electronic focus devices (e.g., a motor that focuses the lens), or the like. In some embodiments, focusing may be done automatically (e.g., without user input) or manually (e.g., based on user input, such as input 214). It is noted that focusing may also be accomplished via control component 220 adjusting parameters of an image (e.g., digital focusing).

One or more sensor(s) 230 may include sensors that measure or detect properties associated with blending system 200. For example, sensor(s) 230 may include temperature sensors, light sensors, motion sensors, proximity sensors, pressure sensors, infrared sensors, spectrometers, optical scanners, multi-wave length scanners, and the like. The sensor(s) 230 may comprise hardware, software, software within hardware, or the like. For instance, a temperature sensor may comprise hardware that measures a temperature and software that reads or communicates the temperature to other components. In an embodiment, sensor(s) 230 may determine temperatures of foodstuff, such as foodstuffs in a blending container (e.g., blending container 120). For example, a temperature sensor may include infrared sensors, thermometers, or the like. As such, the temperature sensor may be disposed within or comprised by a container, a lid, a blender base, display device 206, or the like.

In another example, sensor(s) 230 may include a light sensor. The light sensor may include one or more pixels which may measure properties of light, such as ambient light in an operating environment. For instance, a light sensor may measure an intensity of a light. In another aspect, a light sensor may detect a color of an object based on received light.

In an embodiment, sensor(s) 230 may include proximity detectors that may detect the proximity of a blending container. The proximity may include a distance in terms of units of measurement (e.g., inches, centimeters, etc.), relative terms of measurement (e.g., near, far, etc.), and the like. In another aspect, sensor(s) 230 may detect motion, such as a blending container being attached to a blender base and/or removed from a blender base or the attachment and/or removal of a lid from the blending container.

In another example, sensor(s) 230 may include a pressure sensor. The pressure sensor may detect the presence and/or specific weight of an ingredient added to a blending container. The pressure sensor may be able to detect if an appropriate amount of ingredient was added for the recipe and adjust its display to show any remaining amount that should be added. In another aspect, the pressure sensor may detect the amount of foodstuffs in the container so a user can pour off an appropriate amount for consumption or further food preparation.

Control component 220 may control various aspects of projection device 210, sensor(s) 230, and/or interface 240. For example, control component 220 may instruct projection device 210 to project an image. In embodiments, the image may be store in a memory device (e.g., memory 202), generate by control component 220, and/or remotely stored. As noted above, the image may include various types of information, such as information relating to a blending process, user defined information, and the like.

In embodiments, control component 220 may determine parameters for display of information. For instance, control component 220 may determine parameters for display such as, what information to display, when to display information, how to display information (e.g., light intensity, color, font size, font type, language, etc.), where to display information, and the like. In an example, control component 220 may utilize information from sensor(s) 230 to determine parameters for projection device 210. For instance, control component 220 may determine an intensity of ambient light based on data from sensor(s) 230. The control component 220 may then control operating parameters of projection device 210 and/or instruct projection device 210 to adjust operating parameters based on the sensed light. In an example, control component 220 may increase an intensity or brightness of light emitted by projection device 210 in response to sensor(s) 230 detecting a first threshold amount of light (e.g., bright light). Likewise, control component 220 may decrease an intensity or brightness of light emitted by projection device 210 in response to sensor(s) 230 detecting a second threshold amount of light (e.g., dim light or no light). Also, a color of an image may also be altered and/or selected based on an amount of light, a detect color of a container, a color of foodstuffs within the container, user input (e.g., user desire), or the like.

In another aspect, control component 220 may determine the displayed information based on stored data, data from sensor(s) 230, user input (e.g., input 214), and the like. For example, a user may select a recipe for a blending process. Control component 220 may utilize a recipe stored in a memory (e.g., 202) to determine a level or an amount of ingredients needed. Control component 220 may then instruct projection device 210 to project or display a fill line on a container. The fill line may indicate a quantity of ingredients to be added (e.g., how much foodstuff to add), such as described with reference to FIG. 4. In another aspect, the control component 220 may control projection device 210 to display a type of ingredient to be added to the fill line. The type of ingredient may be represented by text (e.g., "ice," "milk," "chopped vegetables," etc.), images (e.g., image of a specific ingredient or type, such as liquid, solid, etc.), and the like. In another example, a user may enter a desired quantity (e.g., i ounces, where i is a number) and control component 220 may control projection device 210 to project a fill line at an appropriate level. It is noted that other indicia other than a fill line may be utilized, such as a graphical image, shading, or the like. The control component 220 may also instruct projection device 210 to project or display preparation reminders to user (e.g., "tighten lid," or "stir with tamper.").

In an embodiment, in addition to displaying the images, a display system may also read the text aloud to the user. This may allow a user to prepare the next ingredient before reading the display image. In an embodiment, the blender and/or control component 220 may include a speaker of any appropriate construction. In one aspect, the blender may be connected to a smart device and/or a computer and utilize its speakers for such a purpose.

In at least one embodiment, control component 220 may change a displayed image based on detection or occurrence of a triggering event. For example, control component 220 may change what information is displayed based on a temporal schedule (e.g., every 10 seconds, etc.), data from sensor(s) 230 (e.g., an increase in temperature, a change in proximity of a blending container, laser reading that a fill line is reached, etc.), user input, or the like. For instance, a user may indicate that a fill line has been reached by providing input 214 to the interface component 240, such that the display system 200 may advance a recipe to a next ingredient. In another example, control component 220 may display a timer that indicates an amount of time left for a blending process or for other processes. Such timers may be utilized during cooking, blending processes, or another time. For instance, a user may use timers for non-blending process—such as while letting foodstuff cool. The control component 220 may alternate between displaying a temperature and displaying the time. For instance, the control component 220 may instruct projection device 210 to display the timer and switch an image to a temperature indicia after a period of time, when a temperature is reached (e.g., every five degrees, etc.), or the like.

In another aspect, control component 220 may determine when a blender motor is actuated or ceases to be actuated. The control component 220 may determine a change in actuation of a blender motor based on a signal from a blender device, user input, motion detection (e.g., determining if the blender base is vibrating and/or not vibrating), detection of the blender container being connected and/or not connected to a blender base (e.g., an interlocked state), and the like. The control component 220 may control the projection device 210 based on a state and/or change in activity of the motor. For instance, the control component 220 may alter an image (e.g., switch images), activate image stabilization, turn on/off, or the like, based on the state of the motor (e.g., actuated or not actuated).

Control component 220 may be configured to enable focusing, auto balancing, image stabilization, or the like. For instance, a blending container and/or blender base may experience vibration or movement during a blending process. Control component 220 may utilize digital image stabilization and/or auto balancing to adjust for the movement or vibration.

In another aspect, control component 220 may determine a target display area for display of an image. The target display area may be based on the design of a blending container, sensed information (e.g., position of a blending container, etc.), user input, and the like. In an example, sensor(s) 230 may determine a position and/or dimensions of a container, such as based on infrared scanning, image detection, and the like. The control component 220 may adjust and/or determine a target display area based on the position and/or dimensions of the container. The control component 220 may then instruct and/or control projection device 210 to adjust angles of display, lens tilt, lens pitch, focusing, and the like.

As described herein, display system 206 may include or be coupled to a power source. The power source may be internal or external to the display system 206. For instance, the display system 206 may be battery operated. A battery operated system may allow for the display system to be relocated and/or removed form a blender base, container, etc., such as for cleaning. In another aspect, the power source may be external. For instance, the display system 206 may be comprised in a larger device (e.g., blender base 110). The blender base 110 may comprise a power supply and/or may be connected to a power supply, such as a power outlet of a facility (e.g., residential home, commercial kitchen, etc.).

In an aspect, the display system 206 may automatically turn on/off based on the power supply. For instance, the display system 206 may project an image whenever the system is powered. In other examples, the display system 206 may include a separate power switch that a user may manipulate to turn on/off the display system. In at least one embodiment, display system 206 may turn on/off a display based on data from sensor(s) 230. For instance, display system 206 may turn on/off based on a time period (e.g., idle for a period of time), proximity detection (e.g., turn off when container is removed, weight of items in container, presence of lid on container,), and the like.

It is noted that a user may adjust the display parameters described above and/or various other parameters. For instance, a user may adjust a color of an image, a size of the image, a text of the image, a language of the image, a brightness of an image, a position of an image, frequency of displaying images, what images to display and the like. In aspect, a user may adjust the parameters through interaction with interface component 240 to provide input 214 pertaining to control of display system 206. Interface component 240 may include an interface of a blending system, such as controls (e.g., controller 112), buttons, touch screens, and the like. In another aspect, interface component 240 may be at least partially comprised by or within a separate device, such as a user device (e.g., smartphone, tablet, wearable, etc.). In an embodiment, the interface component 240 may be responsive to touch commands (pressure, fingerprint reading, button-pushing, etc.). In an embodiment, the interface component 240 may be responsive to voice commands. In one aspect, the blending system 100 can include a speaker and/or microphone or it can use a smart device/computer to receive and/or replay voice messages.

In an aspect, control component 220 (as well as other components of system 200) may utilize artificial intelligence, statistical models, or other processes and/or algorithms. In embodiments, recipe component 140 may utilize classifiers that map an attribute vector to a confidence that the attribute belongs to a class. For instance, recipe component 140 may input attribute vector, x=(x1, x2, x3, x4, xn) mapped to f(x)=confidence(class). Such classification can employ a probabilistic and/or statistical based analysis (e.g., factoring into the analysis affinities and ingredient attributes) to infer an action that a user desires to be automatically performed. In various embodiments, recipe component 140 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority.

In accordance with various aspects of the subject specification, an example embodiment may employ classifiers that are explicitly trained (e.g., via a generic training data) as well as implicitly trained (e.g., via observing user behavior, blending information, user preferences, historical information, receiving extrinsic information). For example, support vector machines may be configured via learning or training phase within a classifier constructor and feature selection module. Thus, the classifier(s) may be used to automatically learn and perform a number of functions, including but not limited to determining, according to added ingredients (e.g., states and/or quantities), additional ingredients to add to meet user preferences, blending processes associated with functions of a blender motor, suggested levels of ingredients, and the like. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

While various embodiments or examples may refer to a home or personal blender device, it is noted that commercial blender devices may be utilized. Furthermore, embodiments described herein may be utilized on retail settings. For instance, users may order a blended product at a restaurant or retail store.

Turning now to FIG. 3, there depicted is a front view of a blending system including a lid that may display information on a blending container. Blending system 300 may primarily include blender base 310, blending container 320 and lid 340. As depicted, blending container 320 may include a container body 322 and handle 324. A lid 340 may include and/or be coupled to a display system 306. As described above, the display system 306 may be integral to the lid 340 and/or removably attached to the lid 340. In some embodiments, display system 306 may include an internal power supply (e.g., battery). In at least one other embodiment, the display system 306 may be powered by an external power supply. The power supply may be comprised with lid 340 (e.g., solar powered batter) or the like. In another aspect, blender base 310 may supply power, such as through an inductive circuit formed by contacts in the lid 340, blending container 320, and/or blender base 310. Display system 306 may project an image 330 via light emissions 322. The image 330 may be projected onto container body 322.

Figure 4:
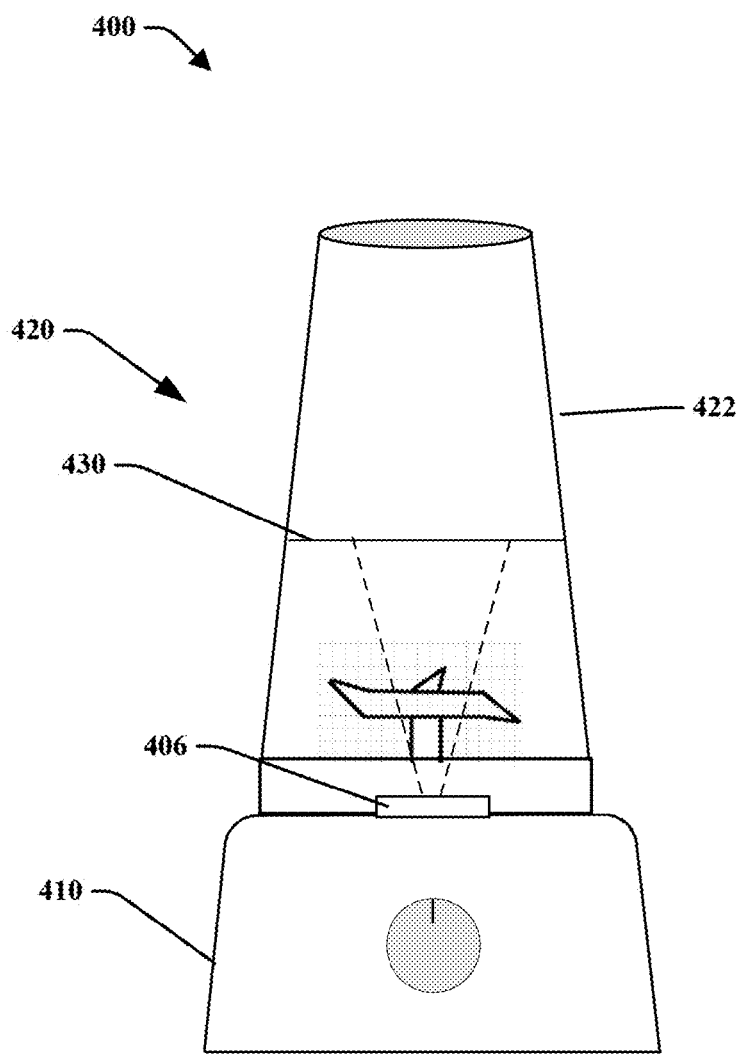
FIG. 4 is a front view of an exemplary blending display system including a single serving container in accordance with various described embodiments.

FIG. 4 is a front view of blending system 400 comprising a single serving blending device that may include a display system. As depicted, system 400 may include single serving container 420 (which includes container body 422), blender base 410, and display system 406. As described above, the display system 406 may be configured for display on a particular blending container and/or may detect properties of a blending container. The display system 406 may determine an appropriate position for display of an image 430 based at least in part on the design of the blending container 420.

In an example, display system 406 may determine a make and model of a blending container, a volume of a blending container, or the like. The display system 406 may appropriately display a fill line (e.g., image 430) on blending container 420.

Figure 5:
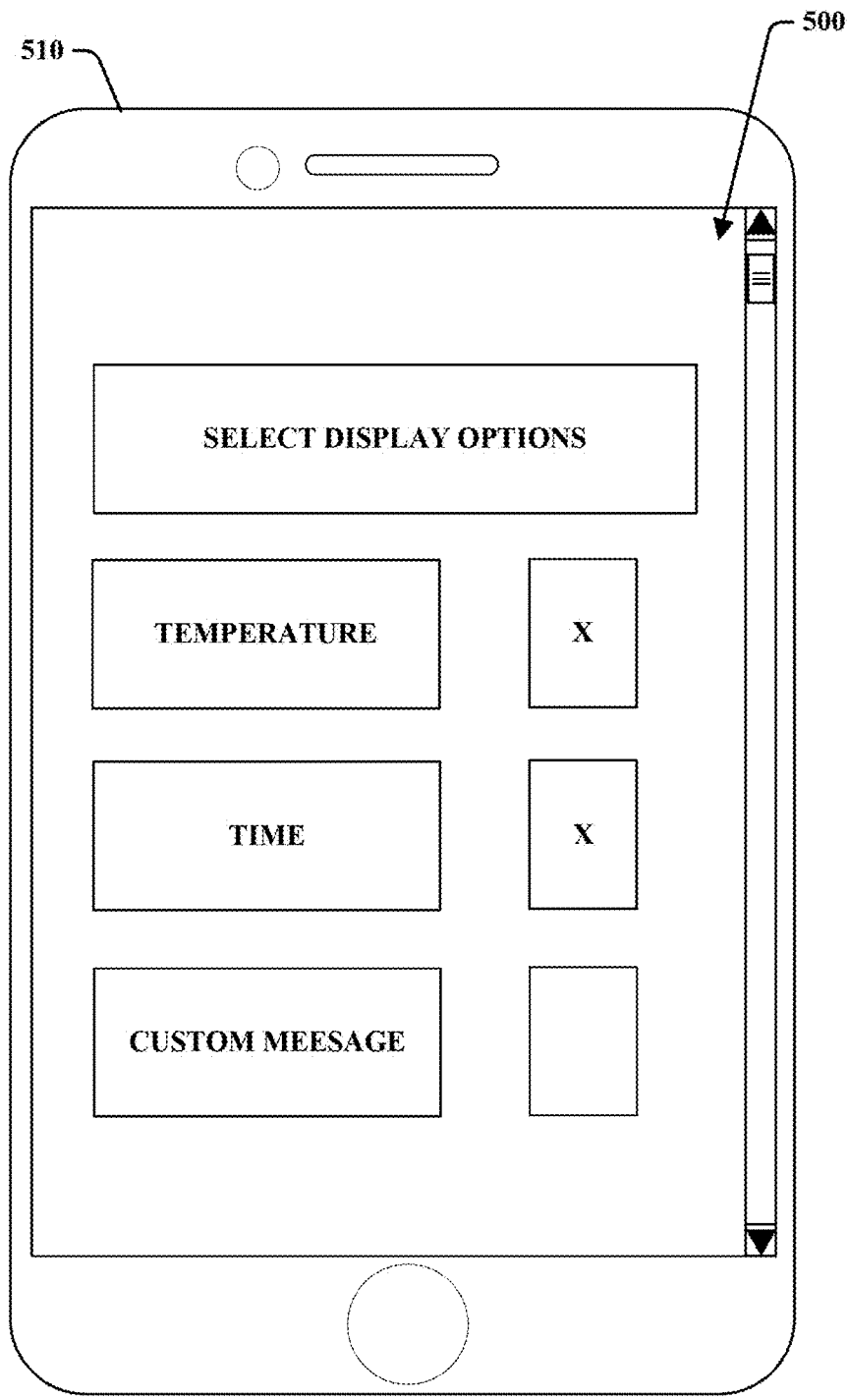
FIG. 5 is a diagram of an exemplary interface for a blending system in accordance with various described embodiments.

FIG. 5 is a user device including a non-limiting user interface 500. While depicted as interfaces of user device 510, it is noted that interface 500 may be an interface of other devices (e.g., blender base 110, etc.). In embodiments, interface 500 may be rendered by a user interface device, such as a monitor of touch screen. In an aspect, a blending system (e.g., system 100, 200, etc.) may communicate with user device 510 to control the user interface and/or parameters of the blending system. For instance, a user may configure or select display options via the interface 500. The user input may be communicated to a blender system. It is noted that various other interfaces and/or controls may be utilized to configure display options.

Figure 6:
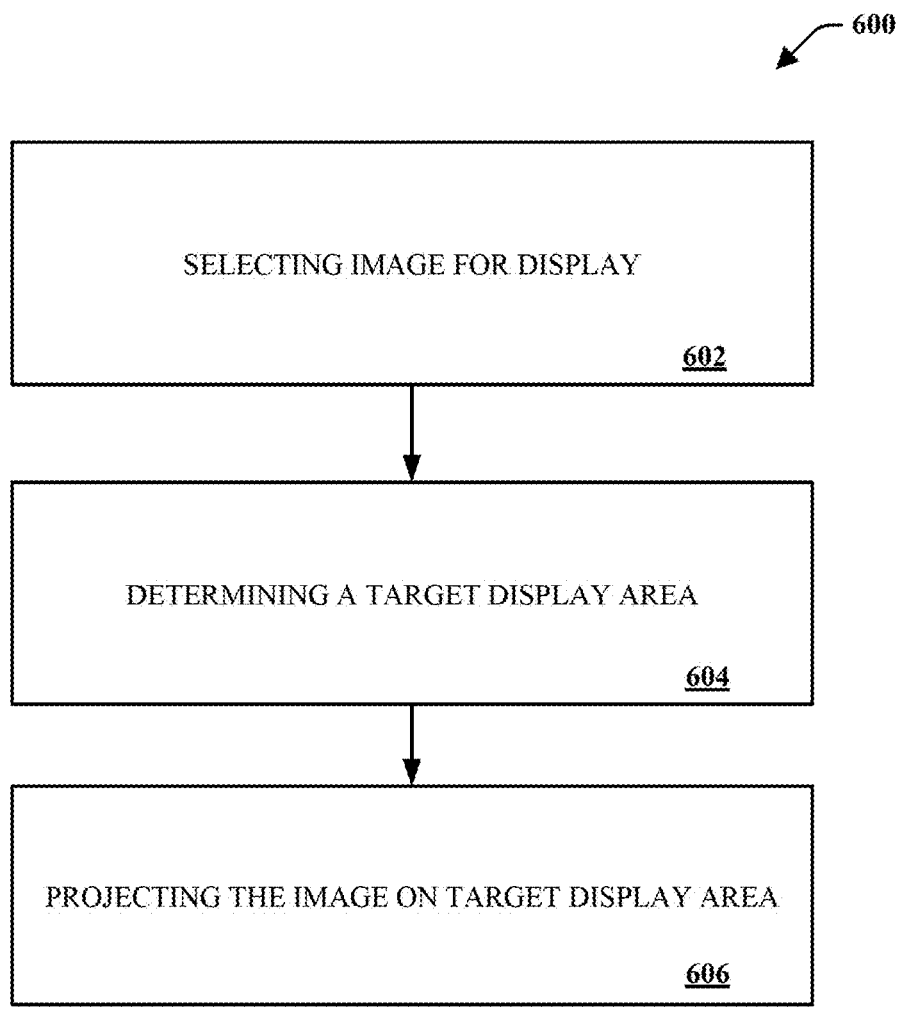
FIG. 6 is a flow diagram of an exemplary method associated with a blender system that may display an image on a blending container in accordance with various described embodiments.

In view of the subject matter described herein, methods that may be related to various embodiments may be better appreciated with reference to the flowcharts of FIG. 6. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 6 depicts an exemplary flowchart of non-limiting method 600 associated with a blending systems, according to various aspects of the subject disclosure. As an example, method 600 may project an image on a blending device.

The method may include, at 602, selecting, by a system (e.g., via display system 206), an image for display. At 604, determining, by the system (e.g., via display system 206), a target display area. The target display area may include a surface of a blending container. At 606, projecting, by the system (e.g., via display system 206), the image on the target display area.

Figure 7:
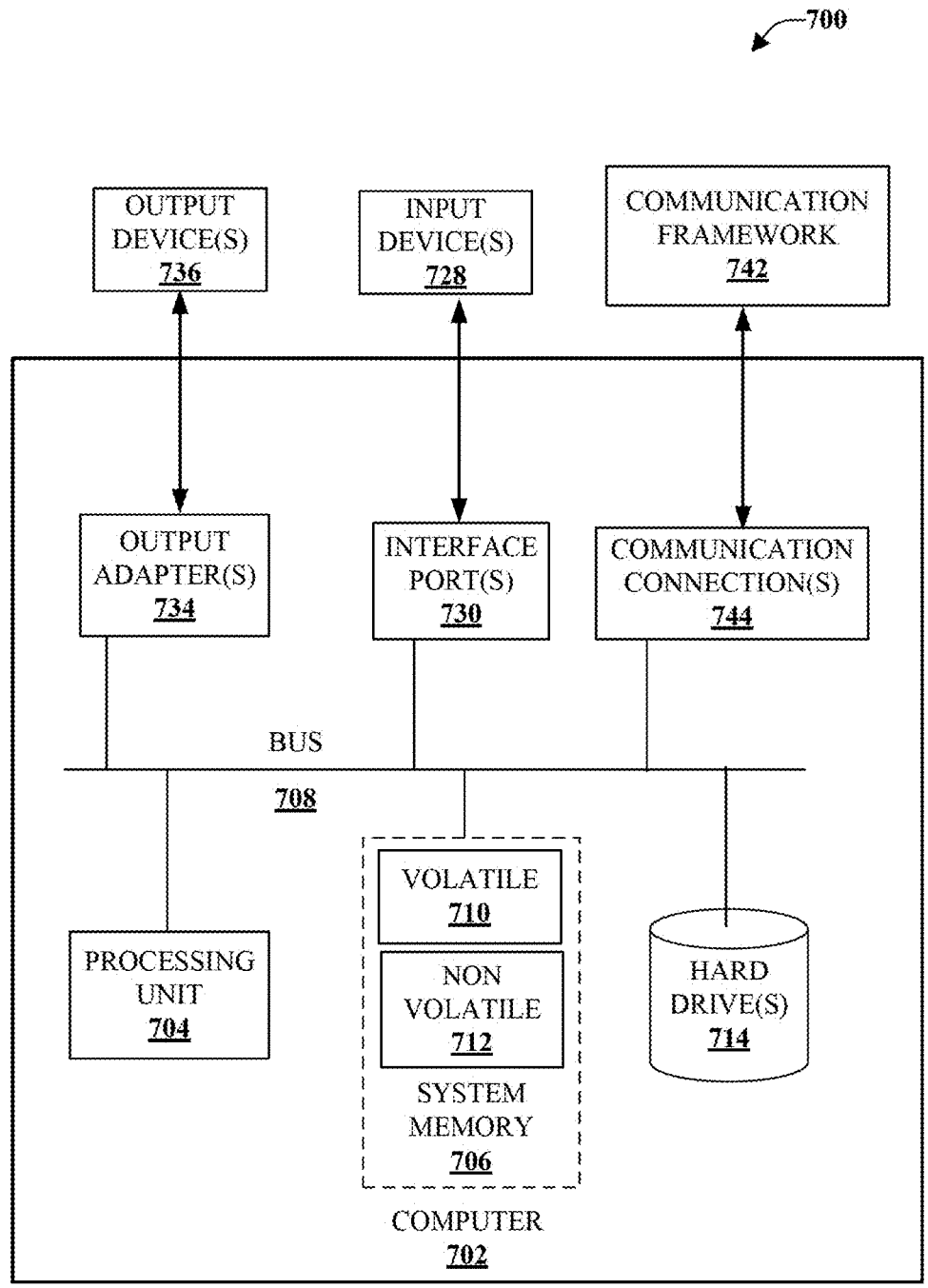
FIG. 7 is a block diagram of a functional computer system in accordance with various described embodiments.

What has been described above may be further understood with reference to FIG. 7. FIG. 7 provides an exemplary operating environment or system capable of implementing one or more systems, apparatuses, or processes described above. FIG. 7 is not intended to limit the scope of such systems, apparatuses, or processes. By way of example, computer system 700 may refer to one or more embodiment of the various embodiments described with reference to the above figures. However, variations to computer system 700 may be obvious to achieve aspects or processes described herein.

FIG. 7 is a block diagram of a computer system 700 that may be employed to execute various disclosed embodiments. It is noted that various components may be implemented in combination with computer executable instructions, hardware devices, and/or combinations of hardware and software devices that may be performed by computer system 700.

Computer system 700 may include various components, hardware devices, software, software in execution, and the like. In embodiments, computer system 700 may include computer 702. Computer 702 may include a system bus 708 that couples various system components. Such components may include a processing unit(s) 704, system memory device(s) 706, disk storage device(s) 714, sensor(s) 735, output adapter(s) 734, interface port(s) 730, and communication connection(s) 744. One or more of the various components may be employed to perform aspects or embodiments disclosed herein. In an aspect, the computer system 700 may identify a blending container and/or identify characteristics of a blending container as described above. For example, the computer system 700 may read an identification tag attached to a blending container and may determine whether a weight of the blending container is within an expected weight range.

Processing unit(s) 704 may comprise various hardware processing devices, such as single core or multi-core processing devices. Moreover, processing unit(s) 704 may refer to a "processor," "controller," "computing processing unit (CPU)," or the like. Such terms generally relate to a hardware device. Additionally, processing unit(s) 704 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

System memory 706 may include one or more types of memory, such as volatile memory 710 (e.g., random access memory (RAM)) and non-volatile memory 712 (e.g., read-only memory (ROM)). ROM may include erasable programmable ROM (EPROM), electrically erasable programmable ROM (EEPROM). In various embodiments, processing unit(s) 704 may execute computer executable instructions stored in system memory 706, such as operating system instructions and the like.

Computer 702 may also include one or more hard drive(s) 714 (e.g., EIDE, SATA). While hard drive(s) 714 is depicted as internal to computer 702, it is noted that hard drive(s) 714 may be external and/or coupled to computer 702 via remote connections. Moreover, input port(s) 730 may include interfaces for coupling to input device(s) 728, such as disk drives. Disk drives may include components configured to receive, read and/or write to various types of memory devices, such as magnetic disks, optical disks (e.g., compact disks and/or other optical media), flash memory, zip drives, magnetic tapes, and the like.

It is noted that hard drive(s) 714 and/or other disk drives (or non-transitory memory devices in general) may store data and/or computer-executable instructions according to various described embodiments. Such memory devices may also include computer-executable instructions associated with various other programs or modules. For instance, hard drives(s) 714 may include operating system modules, application program modules, and the like. Moreover, aspects disclosed herein are not limited to a particular operating system, such as a commercially available operating system.

Input device(s) 728 may also include various user interface devices or other input devices, such as sensors (e.g., microphones, pressure sensors, light sensors, etc.), scales, cameras, scanners, facsimile machines, and the like. A user interface device may generate instructions associated with user commands. Such instructions may be received by computer 702. Examples of such interface devices include a keyboard, mouse (e.g., pointing device), joystick, remote controller, gaming controller, touch screen, stylus, and the like. Input port(s) 730 may provide connections for the input device(s) 728, such as via universal serial ports USB ports), infrared (IR) sensors, serial ports, parallel ports, wireless connections, specialized ports, and the like.

Output adapter(s) 734 may include various devices and/or programs that interface with output device(s) 736. Such output device(s) 736 may include LEDs, computer monitors, touch screens, televisions, projectors, audio devices, printing devices, or the like.

In embodiments, computer 702 may be utilized as a client and/or a server device. As such, computer 702 may include communication connection(s) 744 for connecting to a communication framework 742). Communication connection(s) 744 may include devices or components capable of connecting to a network. For instance, communication connection(s) 744 may include cellular antennas, wireless antennas, wired connections, and the like. Such communication connection(s) 744 may connect to networks via communication framework 742. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework 742 may include multiple networks connected together. For instance, a Wi-Fi network may be connected to a wired Ethernet network. In at least one embodiment, the computer system 700 may download or receive profiles associated with blending containers. The profiles may contain information such as weight, color, purchase date, and the like.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending display system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blending system comprising:
a base including a motor and a display system, wherein the display system comprises a lens, a light source, a control component operatively controlling the display system, and at least one sensor capable of evaluating data to provide feedback to the control component; and
a container operably attached to the base;
wherein the display system is at an angle with the container when the container is operatively attached to the base, and wherein the lens operatively focuses a light from the light source onto the container, and
wherein the display system projects an image onto the container based on a detection of a triggering event.

2. The blending system of claim 1, wherein the display system is operatively attachable to the base.

3. The blending system of claim 1, wherein the display system further comprises at least one focus device.

4. The blending system of claim 1, wherein the at least one sensor is selected from at least one of a temperature sensor, a motion sensor, a proximity sensor, a pressure sensor, an infrared sensor, a spectrometer, an optical scanner, or a multi-wave length scanner.

5. The blending system of claim 1, wherein the triggering event is a specific detection by the at least one sensor.

6. The blending system of claim 1, further comprising an interface component including user controls, and wherein the triggering event is an input into the interface component.

7. The blending system of claim 1, wherein the image is a recipe, a measurement of an ingredient, a fill line, a clock, a timer, or a graphical image.

8. A blender display system comprising:
a projection device that projects an image;
a control component operatively controlling the projection device; and
at least one sensor coupled to the control component and operatively evaluating data associated with a blender device to provide feedback to the control component,
wherein the control component instructs, in response to the feedback, the projection device to project information onto a blending container, wherein the information is based on the feedback,
wherein the projection device is comprised within a blender lid, and wherein the blender lid comprises a power source within the blender lid.

9. The blender display system of claim 8, wherein the projection device operatively receives power from a blender base of the blender device.

10. A method of displaying images on a blending system comprising:
selecting, by a display system, an image for display onto a blender container;
controlling, by a control component, the display system;
receiving, by a control component, feedback from blending sensors; and
displaying, by the display system projects, the image on the blender container based on a detection of a triggering event.

11. The method of claim 10, further comprising:
determining, by the display system, a target display area of the blending container.

12. The method of claim 10, further comprising:
adjusting the image for display in response to the feedback.

13. The blending system of claim 1, wherein the projection device is disposed at an angle to project the image towards the container.

* * * * *